United States Patent Office 3,207,673
Patented Sept. 21, 1965

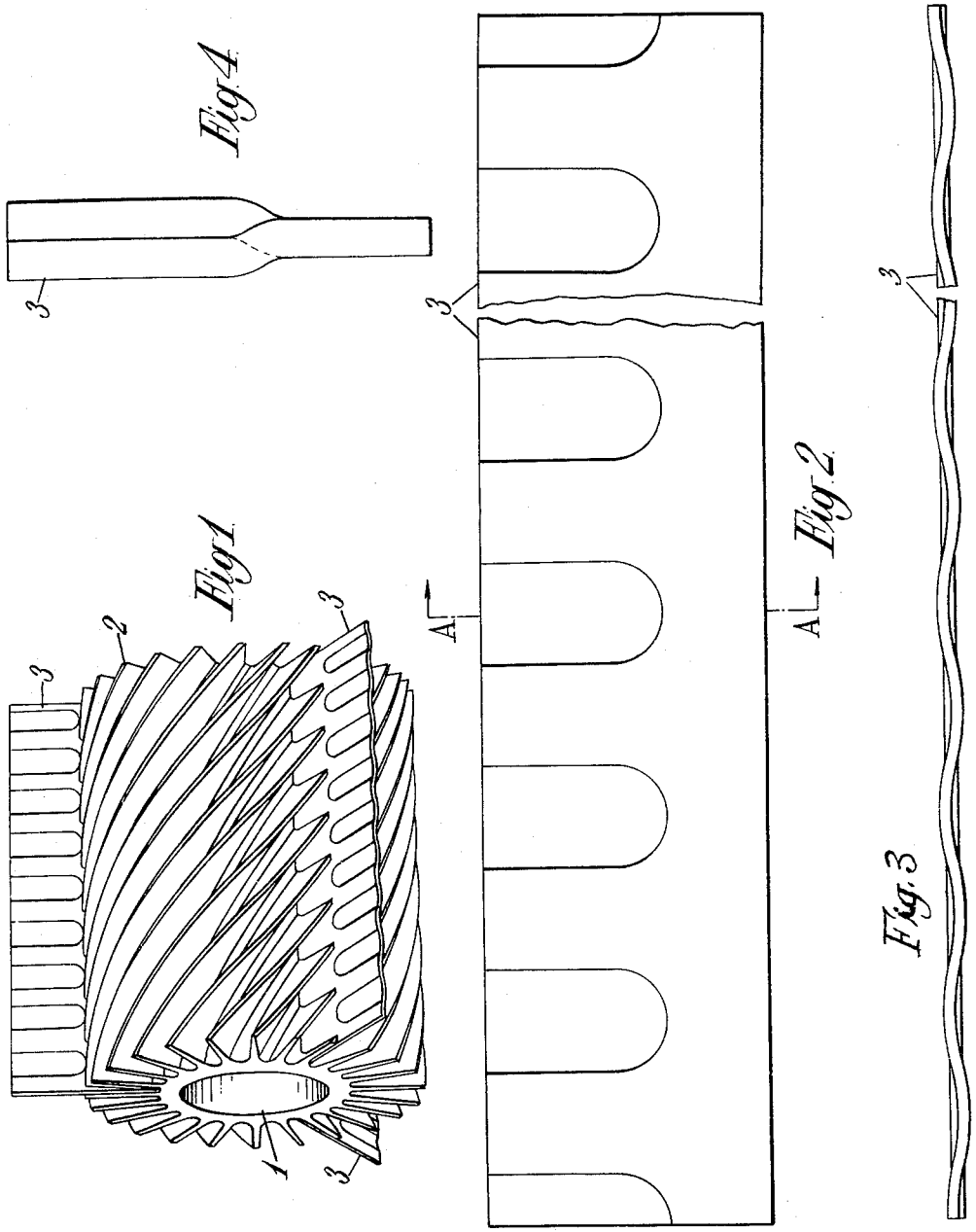

3,207,673
NUCLEAR REACTOR FUEL ELEMENT HAVING IMPROVED FIN STRUCTURE
Andrew T. Bowden, Newcastle-upon-Tyne, England, assignor to C. A. Parsons & Company Limited, Newcastle-upon-Tyne, England
Filed Aug. 27, 1958, Ser. No. 757,585
Claims priority, application Great Britain, Sept. 27, 1957, 30,319/57
1 Claim. (Cl. 176—81)

This invention relates to fuel elements for nuclear reactors.

A common form of fuel element for a nuclear reactor consists of a sealed container housing a nuclear fuel.

In co-pending patent application Serial No. 618,258 (assigned to C. A. Parsons & Co., Ltd. of Heaton Works, Newcastle-upon-Tyne 6, in the County of Northumberland, England) is described a fuel element of this form in which the surface of the container had fins formed thereon which were helically disposed with respect to the central axis of the element. Baffle means were arranged to deflect the fluid flowing in flow channels formed by the fins, the arrangement being such as to induce the fluids to flow in a helical path about an axis which was itself a helix, for instance the flow channels for cooling fluid formed between the fins were interrupted at intervals by baffles which were disposed axially with respect to the element.

These baffles in the form more particularly described with reference to drawings comprised rectangular strips of material which were located in slots cut in the fins, and they extended in a radial direction from the surface of the container to a position beyond the tips of the helical fins.

Fuel elements of the above type are commonly located in bores formed in a moderating material in a reactor and a cooling fluid is caused to flow over the surface of the elements removing the heat developed therein.

When replacing fuel elements with new fuel elements during the operation of the reactor, the new element is immediately brought into contact with hot cooling fluid.

The resultant effect is that initially the part of each baffle remote from the fuel is heated very quickly, whilst that part held between the fins and in contact with the wall of the container is relatively cool as the nuclear fuel does not heat up instantaneously. This short period of temperature difference over the baffles produces a tendency to distort.

The object of the present invention is to provide a fuel element of the kind in which such tendencies to distort are controlled.

The invention consists in a fuel element for a nuclear reactor which element comprises a nuclear fuel housed in a container, said container having on its outer surface fins which are helically disposed with respect to the central axis of the container and baffles extending axially of the container interrupting the channels formed between the fins, said baffles extending outwardly beyond the tips of the fins, in which fuel element the part of each baffle which is located beyond the helical fins is corrugated transverse to the axis of the fuel element.

The invention also consists in a fuel element for a nuclear reactor substantially as described below.

Referring to the accompanying diagrammatic drawings:

FIGURE 1 shows a typical container for a fuel element in accordance with one form of the present invention;

FIGURE 2 shows a side view of a baffle suitable for use in connection with the invention;

FIGURE 3 shows a plan view of FIGURE 2;

FIGURE 4 is a section on the line A—A of FIGURE 2.

In carrying the invention into effect in the form illustrated by way of example and referring first of all to FIGURE 1, this shows a typical container 1 for nuclear fuel of the kind to which the present invention relates. The container 1 has fins 2 helically disposed with respect to its central axis. Interrupting the channels formed between the fins are baffles 3 which consist of a strip of material running parallel to the central axis of the container.

The part of the baffle shown more particularly in FIGURES 2 to 4 extending beyond the fins is corrugated.

By corrugating part of the baffle as shown distortion produced by the initial temperature differences described may be controlled so that adverse effects are minimised or prevented.

I claim:

A fuel element for a nuclear reactor which element comprises a nuclear fuel housed in a container said container having on its outer surface fins which are helically disposed with respect to the central axis of the container and baffles extending axially of the container interrupting the channels formed between the fins, said baffles extending outwardly beyond the tips of the fins, in which fuel element the part of each baffle which is located beyond the helical fins is corrugated transverse to the axis of the fuel element.

References Cited by the Examiner
UNITED STATES PATENTS

| | | |
|---|---|---|
| 1,881,610 | 10/32 | Hyde. |
| 1,993,539 | 3/35 | Anthony. |
| 2,492,932 | 12/49 | Fausek et al. |
| 2,709,128 | 5/55 | Krause. |
| 2,874,940 | 2/59 | Ahlen. |
| 2,885,335 | 5/59 | Moore et al. |

OTHER REFERENCES
Nucleonics, June 1955, page 93.

REUBEN EPSTEIN, *Acting Primary Examiner.*
CARL D. QUARFORTH, ROGER L. CAMPBELL, *Examiners.*